(12) United States Patent
MacLean

(10) Patent No.: US 7,300,086 B2
(45) Date of Patent: Nov. 27, 2007

(54) SLIDE OUT FOR A MOTOR HOME

(75) Inventor: Colin MacLean, Ashmore (AU)

(73) Assignee: Paradise Motor Homes Pty. Ltd, Asmore Qld (AU)

( * ) Notice: Subject to any disclaimer, the term of this patent is extended or adjusted under 35 U.S.C. 154(b) by 176 days.

(21) Appl. No.: 11/142,742

(22) Filed: Jun. 1, 2005

(65) Prior Publication Data

US 2006/0131912 A1    Jun. 22, 2006

(30) Foreign Application Priority Data

Dec. 16, 2004    (AU) ............................. 2004907145

(51) Int. Cl.
*B62D 33/08*    (2006.01)
(52) U.S. Cl. ................................. 296/26.13
(58) Field of Classification Search ............. 296/26.12, 296/26.13, 26.08, 26.09
See application file for complete search history.

(56) References Cited

U.S. PATENT DOCUMENTS

| 5,634,683 | A | | 6/1997 | Young .......................... 296/165 |
| 5,951,082 | A | * | 9/1999 | DiBiagio et al. ......... 296/26.13 |
| 6,135,525 | A | | 10/2000 | Amann .................... 296/26.11 |
| 6,266,931 | B1 | * | 7/2001 | Erickson et al. ................ 52/67 |
| 6,637,794 | B2 | * | 10/2003 | McManus et al. ........ 296/26.01 |
| 6,932,403 | B2 | * | 8/2005 | Meijer et al. ............ 296/26.01 |
| 6,969,105 | B2 | * | 11/2005 | Rincoe ..................... 296/26.13 |

* cited by examiner

*Primary Examiner*—Joseph D. Pape
(74) *Attorney, Agent, or Firm*—Gifford, Krass, Sprinkle, Anderson & Citkowski, P.C.

(57) ABSTRACT

A vehicle that is a motor home having a slide out body member that extends across an opening in the side wall of the vehicle body is disclosed. The slide out body member is capable of movement between a laterally expanded position during recreational use of the vehicle and a refracted position for travel of the vehicle on roads. The slide out body member has a primary wall portion covering at least a portion of the side wall of the vehicle body and end walls at each end of the primary wall portion extending back towards the vehicle body. The slide out body member also has a top and a bottom extending from the upper and lower edges of the primary wall portion back towards the vehicle body so that the space defined by the slide out body member opens into and forms part of the interior space of the vehicle body. The vehicle also includes a service connector in the form of a flexible conduit extending between the vehicle body and the associated service fittings in the vehicle slide out. It also includes a conduit organizer for guiding the flexible conduit to fold up and then unfold when the slide out body member is moved between the expanded and refracted positions.

13 Claims, 12 Drawing Sheets

SLIDE OUT FOR A MOTOR HOME

RELATED APPLICATION

This application claims priority of Australian Patent Application 2004907145 filed Dec. 16, 2004, the contents of which are incorporated herein by reference.

FIELD OF THE INVENTION

This invention relates to a slide out for a vehicle. This invention extends to a vehicle including the slide out.

This invention relates particularly but not exclusively to a slide out for a vehicle that is a motor home and it will be convenient to hereinafter describe the invention with reference to this example application. However it is to be clearly understood that the invention is capable of broader application. For example the invention may be equally applied to caravans. The invention may also be applied to other passenger carrying vehicles that are used for recreational purposes and can be adapted for people to sleep in them.

DEFINITIONS

In this application the term motor home shall be understood to cover a vehicle that has its own motive power and is capable of being driven and that has an area behind the driver's seat that is adapted to be lived in. For example it has a sleeping area, a kitchen and a bathroom. Typically the motor home is formed by taking a light commercial vehicle that is available in the market place and then modifying the rear part of the vehicle to make it suitable for living in.

In this specification a caravan shall be understood to be a vehicle mounted on wheels that does not have its own motive power and is towed to where it is required.

Further in this application a slide out shall be understood to mean at least a portion of the side wall of a vehicle that can be laterally displaced outwardly when the vehicle is not being driven around to create more space and a larger living area inside the vehicle. The portion of the side wall that slides out may be rearward of the front doors of the vehicle. However at the same time Applicant envisages that a slide out may conceivably also extend the whole length of the vehicle and include the front doors on the vehicle.

BACKGROUND TO THE INVENTION

The modification of vehicles to make them suitable for being lived in is known. For example caravans that are towed by powered vehicles such as a family car are well known. A caravan comprises a passive vehicle mounted on wheels that has an interior that has been adapted to be lived in. For example it might typically contain a kitchen and living area and optionally also a bathroom and toilet facility.

The caravan is towed by a car, typically the family car, to where it is required and then it is detached and set up as a place to live in. The presence of caravans in caravan parks near the seas is a ubiquitous feature of Australian society. It offers flexibility in the sense that the caravan can be towed to wherever it is required and it is not fixed to a single destination. Further it offers a living area with fairly comfortable amenities and is considerably cheaper than hotel or unit accommodation.

A development on the caravan has been the motor home. This comprises a vehicle that has an engine and a front seat for a driver and passenger and also driver's controls that enable it to be driven in the usual way like any other car. It also has an area behind the front seat that has been adapted to form a living space having considerable amenities. For example it might contain a bed, cupboards, a kitchen area, a storage area for clothes and the like, and a washing area often with a toilet and a basin. It thus provides a living area not unlike that of a caravan that is integral with the car as distinct from being a separate vehicle.

Motor homes are often preferred by couples because they are more compact than caravans and do not need to be hitched up and then unhitched all the time. One can simply get in a motor home and drive off. With the change in lifestyles that is occurring and with baby boomers starting to retire the uptake and usage of motor homes has increased markedly and this increase is predicted to continue.

A motor home is made by taking a light commercial van of a type tat is commercially available and is purchased off a show room floor and then fitting out the rear of the vehicle to create the living space. For example a light commercial Mercedes vehicle can conveniently be used, eg the Mercedes Benz Sprinter 313 CDI long wheel base van. The interior space of these vehicles is limited. Road regulations typically specify that the maximum width of a vehicle travelling on the roads is 2.5 m.

A constant challenge in designing motor homes is to utilize the limited space that is available in the best possible way thereby to provide a comfortable and functional living environment. While some development and improvement has taken place in this area over the years there is a continuing need to come up with further improvements to further improve utilization of the very limited space. This is particularly so as more and more affluent and discerning customers start using motor homes.

A particularly limited dimension in a motor home is the lateral width of the vehicle. Accordingly it would clearly be advantageous if the motor home could be adapted to be able to create a wider living area when the motor home was parked and transformed into their recreational or camping mode in a way that was trouble free, reliable and did not impose a requirement for additional drive systems which in turn used up more of the precious space within the vehicle body.

SUMMARY OF THE INVENTION

According to one aspect of this invention there is provided a vehicle having a slide out. The vehicle includes a vehicle body having a wall including two side wall sections and defining a vehicle interior. At least one slide out body member extends across an opening in a side wall section of the vehicle body that is capable of movement between a laterally expanded position during recreational use of the vehicle and a retracted position during use of the vehicle for travel on the roads. The slide out body member has a primary wall portion for covering at least a portion of the side wall section of the vehicle body and the body member also includes end walls and a bottom and roof extending transverse to the primary wall portion in a direction into the vehicle body so that the space defined by the slide out member opens into and forms part of the vehicle interior. A support supports the body member on the body of the vehicle in a way that permits sliding of the slide out relative to the body of the vehicle between the expanded and retracted positions. A drive moves the body member between said expanded and retracted positions on said support.

The support can include at least two sets of complementary guide rail formations on each of the slide out body member and the vehicle body, eg longitudinally spaced from each other.

The guide rail formations may include a female member defining a passage open at one end on one of the slide out body member and the vehicle body, and a male member that is sized to be received within the open end and passage of the female member on the other of the slide out body member and the vehicle body.

One or more of the female members may be mounted on the vehicle body and one or more of the male members may be mounted on the slide out member. This way the square tube with the open end is mounted on the vehicle body and the smaller male member which is received therein is mounted on the slide out member. This arrangement is also preferred for guiding movement of the slide out member very precisely relative to the vehicle body.

The female member can include a square tube with an open end. The male member can include a length of square rod or square tube. The male and/or female members may be coated with a friction reducing coating to assist sliding movement of the male member relative to the female member.

The coating may be a polymer coating, eg a synthetic polymer coating. The coating may be nylon or polyurethane and may have a thickness of 1 mm.

In one particular embodiment there are more than two said engaging male and female members along the length of the slide out member, eg four to six said engaging male and female members. The engaging male and female members may be spaced apart from each other, along the length of the slide out member. One said pair of male and female engaging members may be located at or proximate to each end of the slide out member.

The drive may include a linear actuator, a hydraulics system including a piston and a cylinder, an air or pneumatic system including an air ram, or a ratchet and pawl.

The drive can include at least one linear actuator with a shaft operatively mounted on to the vehicle body or the slide out body member and a passive actuator element defining an opening through which the shaft of the linear actuator is passed, mounted on to the other of the vehicle body or the slide out body member, whereby rotation of the shaft relative to the passive actuator element effects translational displacement of the passive actuator element in an axial direction along the shaft and thereby lateral displacement of the slide out body member relative to the vehicle body.

Thus the slide out member can be moved laterally outwardly to the expanded position to increase the living space defined within the vehicle interior when the vehicle is being used for recreational use. The space defined by the slide out member is used to increase the interior space within the vehicle body. The slide out member is returned to the retracted position prior to the vehicle being used for transport again.

The support supports the slide out member on the vehicle body for movement laterally outward into the expanded position on demand. This movement is effected by a linear actuator which is very precise and does not occupy a large amount of space.

The shaft of the linear actuator may be mounted on the vehicle body and the passive actuator element may have the slide out member mounted thereto. This way the motor for rotating the shaft may be located on the vehicle body.

The passive actuator element may comprise a nut that is mounted on the slide out body member in such a way that it is held against rotation by the slide out body member. The slide out body member may define a non circular formation within which the nut is received whereby to hold it against rotation.

The linear actuator may include an electric motor for rotating the shaft of the linear actuator. Motors for linear actuators would be well known in the art.

The vehicle may include a motor energizer that rotates the shaft of the linear actuator. The motor energizer can include a battery for supplying electrical energy at a certain potential difference. The battery may be the battery in the vehicle that is used to supply energy for ignition and services to the vehicle.

The linear actuator may include a travel limit for limiting the travel of the nut along the shaft in each direction. The travel limit can include limit switches at each end of the range of travel.

Each slide out body member may include two said linear actuators, eg longitudinally spaced from each other along the length of the primary wall portion. The linear actuators may be positioned towards ends of the primary wall portion.

The slide out body member may further include a floor vertically intermediate said bottom and said roof and define a living space between said floor and said roof and a services compartment between said floor and said bottom.

Thus the interior space of the slide out member is vertically divided up into a living space which opens into the vehicle interior and forms part of the amenity of the vehicle which can be occupied by people, and a services compartment beneath the living space. Thus the services compartment is located beneath the floor and is immediately above the bottom of the slide out.

The male and female members of the guide rail formations described above may be located in the services compartment. Further any other structural members extending between the vehicle body and the slide out member may be located in the services compartment.

The vehicle may include a service connector from the vehicle body to the associated service fittings in the vehicle slide out. The service connector can include one or more flexible conduits, each conduit carrying a service which is located in the services compartment beneath the floor, one end of the conduit being connected to that service on the vehicle body and the other end being connected to that service on the slide out body member.

The services that are provided through the services conduits may include: electricity for energizing appliances and lights, eg 12 V and 240V, water for washing and cooking, gas for cooking and heating, and drainage for draining water from a kitchen sink, shower and/or a hand basin.

One such flexible conduit may be in the form of a flexible pipe that carries water to the slide out. Another flexible conduit may be in the form of a flexible pipe that carries gas to the slide out. Another such flexible conduit may contain flexible electrical cable for supplying electricity to the slide out member. Another flexible conduit may form or contain a drain pipe that drains waste water from the slide out member.

Each flexible conduit may have one end operatively coupled to a service supply element on the vehicle body and an opposed end operatively coupled to the corresponding service receiving element on the vehicle slide out. Each flexible conduit may have sufficient length to accommodate movement of the slide out member from the retracted to the expanded positions without a tensile stretching force being applied thereto. That is the conduit may have sufficient length that it is not quite fully extended in the expanded position.

The services compartment may be sized to receive the necessary length of the flexible conduit to allow movement between the retracted and expanded conditions for all services. That is the compartment can accommodate with comfort all the extra length of the various service conduits when the slide out member is in the retracted position.

The vehicle may further include a conduit organizer in the services compartment to assist in guiding the conduits to unfold in an organized fashion when the slide out member is moved to the expanded position and to guide the conduits to fold up in an organized fashion when the slide out member is moved back in to the retracted position. The conduit organizer may include a partition member that extends into the services compartment, eg from the primary wall portion.

The partition member may extend parallel to the end walls of the slide out member or transverse to the primary wall portion of the slide out member. Further the partition member may extend from the primary wall portion at least part of the width of the slide out body member in a direction towards the interior of the vehicle body.

The optional features of each said slide out member have been described above. The following description will look at how the slide out member is incorporated on the vehicle body and also define features of the vehicle body.

The vehicle defined in the broad statement of the invention defines at least one slide out member extending across the side of a vehicle body. However often the vehicle may have slide out members on each of left and right hand sides of the vehicle. This enables both left and right hands sides of the vehicle to be expanded out to increase the living space in the vehicle interior. One such slide out may form part of the kitchen area of the vehicle interior and the other slide out may form a part of the bedroom of the vehicle interior. Each slide out member may be positioned rearward of the front seat.

Thus when the vehicle goes into camping mode the left and right hand slide out members can be expanded into their expanded conditions to create a substantially larger area within the vehicle for use as a living area. The cabin created is much wider that that which could otherwise be created in a vehicle with fixed walls that was licensed to travel on public roads.

The vehicle may be in the form of a motor home.

The motor home may have its own motive means, eg in the form of a petrol or diesel engine for enabling it to be driven by it is own means. The motor home may have a battery associated with motive means in the usual way and this battery may also form said battery for energizing the linear actuator.

The body of the motor home may define a vehicle interior comprising a front seat area including driver's seat and a living space rear of the front seat.

According to another aspect of this invention there is provided a slide out body member for mounting to a vehicle body, the slide out member comprising: a primary wall portion for covering over the side of the vehicle and also end walls and a bottom and roof extending transverse away from the primary wall portion in a direction into the vehicle body so as to enclose an interior space of the slide out member within an interior of the vehicle body, the slide out body member being capable of movement between a laterally expanded position during recreational use of the vehicle and a retracted position during use of the vehicle for travel on the roads; a support means for supporting the body member on the body of the vehicle in a way that permits sliding of the slide out relative to the body of the vehicle between the expanded and retracted positions; and a drive means for driving the body member between said expanded and retracted positions on said support means, the drive means comprising a linear actuator with a shaft for operatively mounting to the vehicle body or the slide out body member and a passive actuator element through which the shaft of the linear actuator is passed for operatively mounting to the other of the vehicle body or the slide out body member such that rotation of the shaft relative to the passive element effects translational displacement of the passive element relative to the shaft and the slide out body member relative to the vehicle body.

The shaft of the linear actuator may be for mounting to the vehicle body. The passive actuator element may be a nut which is mounted to the slide out body member.

The slide out may include any one or more of the optional features described above in the first aspect of the invention.

DETAILED DESCRIPTION OF THE PREFERRED EMBODIMENTS

A vehicle having a slide out body member and a slide out body member in accordance with this invention may manifest itself in a variety of forms. It will be convenient to hereinafter provide a detailed description of one embodiment of the invention with reference to the accompanying drawings. The purpose of providing this detailed description is to instruct persons having an interest in the subject matter of the invention how to put the invention into practice. It is to be clearly understood however that the specific nature of this detailed description does not supersede the generality of the preceding statements.

Figure 1:
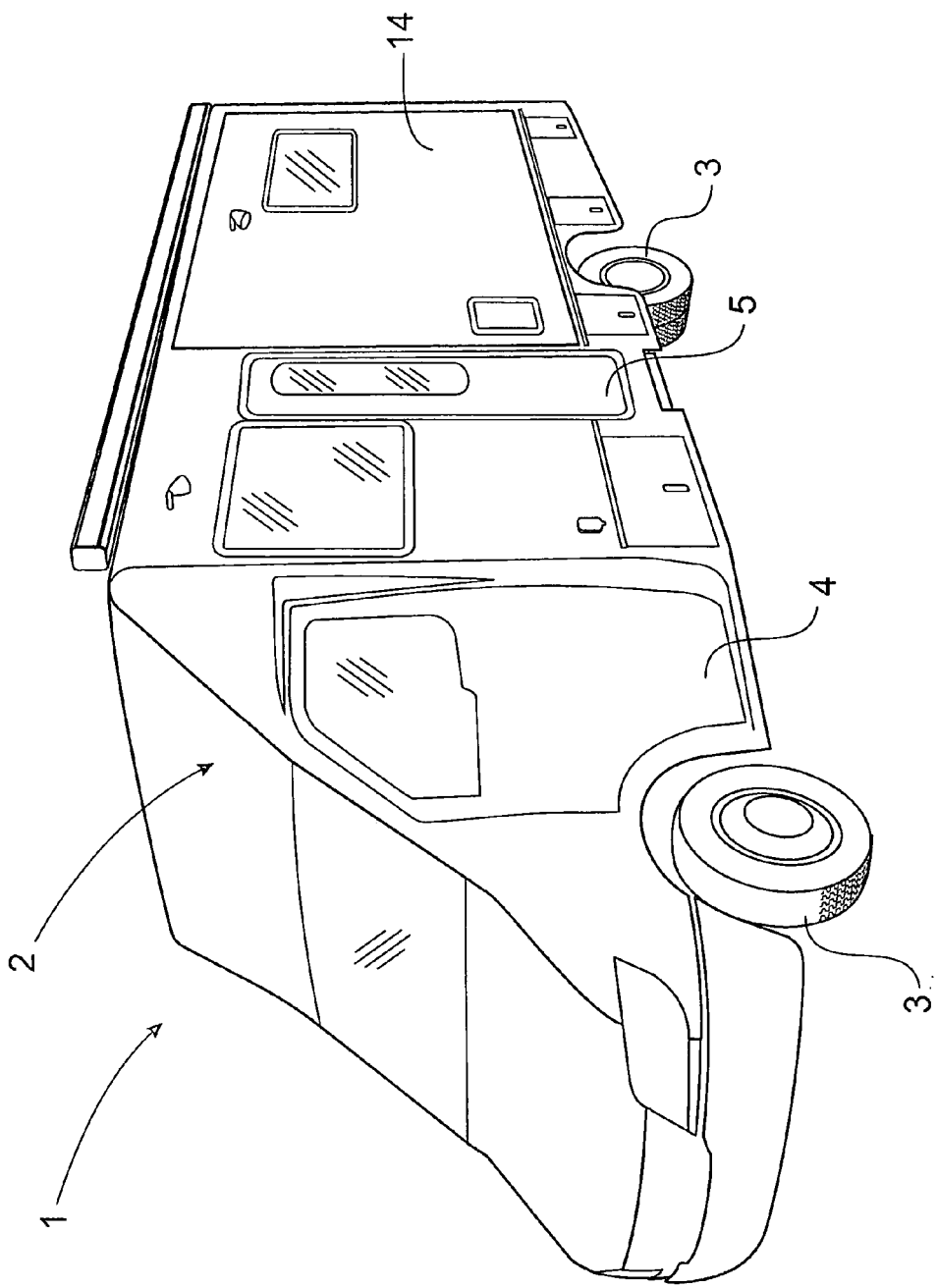
FIG. 1 is a three-dimensional view of a vehicle that is a motor home with left and right side slide out members in their retracted conditions.
Figure 2:
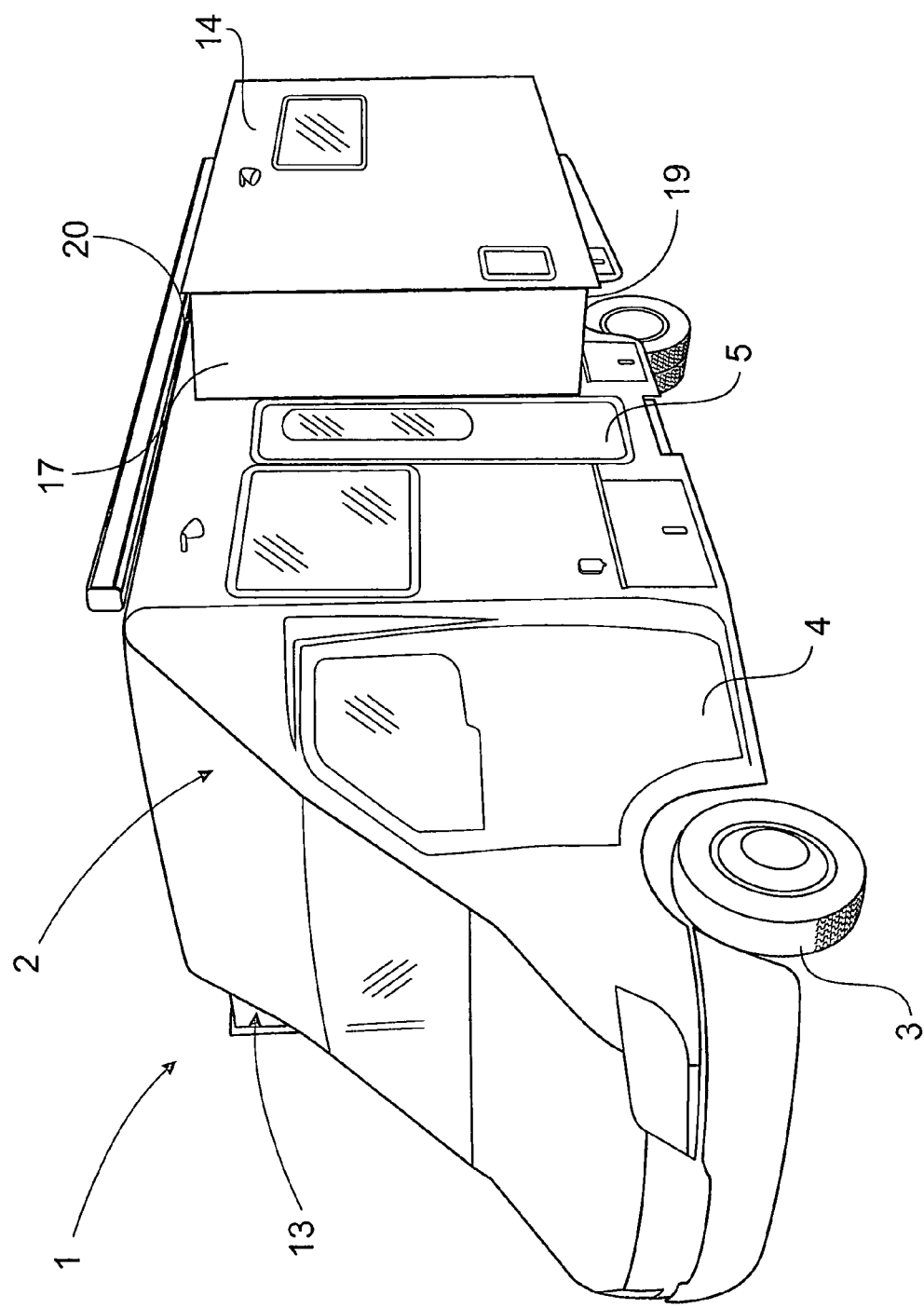
FIG. 2 is a three-dimensional view of the vehicle of FIG. 1 showing the slide out members in their expanded conditions.
Figure 3:
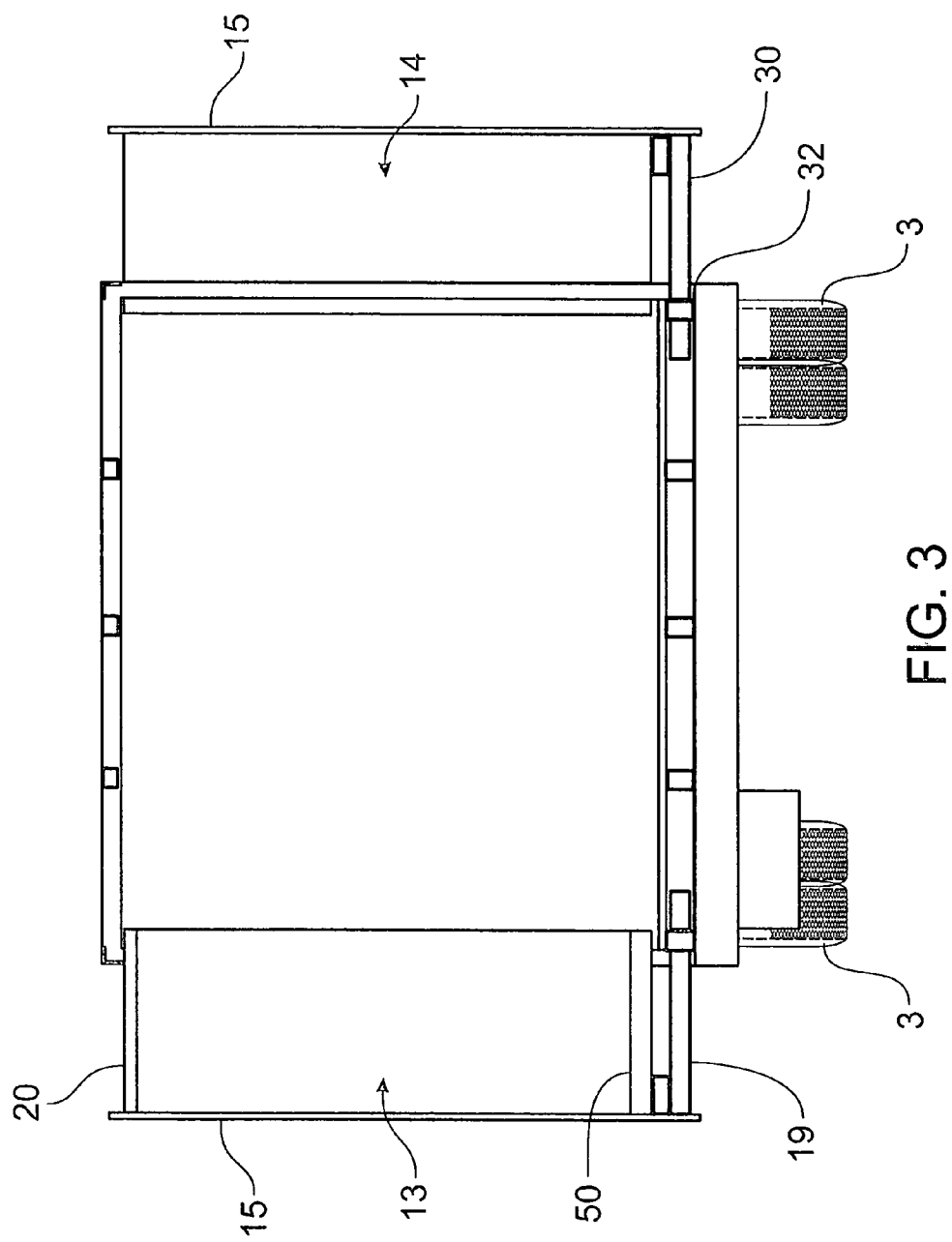
FIG. 3 is a cross-sectional view through the vehicle and the associated slide out members of FIG. 1 with the slide out members in the expanded condition.
Figure 4:
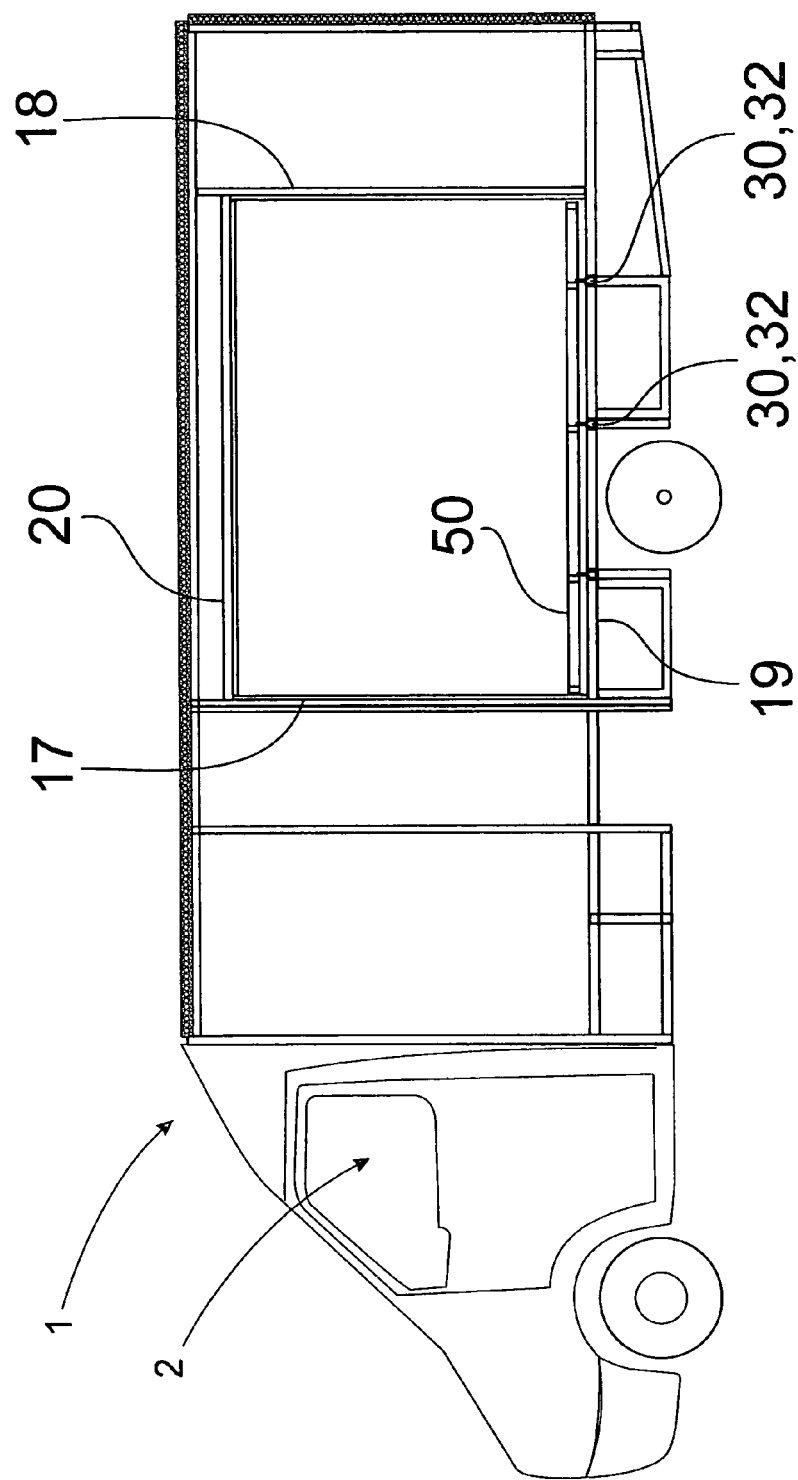
FIG. 4 is a longitudinal section through the vehicle and slide out members of FIG. 1.

In FIGS. 1 and 2 reference numeral 1 refers generally to a vehicle that is a motor home having two slide out body members in accordance with the invention.

The motor home 1 includes broadly a vehicle body 2 having a vehicle wall including two side wall sections and defining a vehicle interior. The vehicle interior is in turn divided up circumferentially into a front seat area having a front seat where a driver and passenger sit and a living area behind the front seat. The body 2 is mounted on four wheels 3 in the usual way and is powered by an engine typically a petrol or diesel engine located within the body 2 towards the front of the vehicle 1.

The motor home has front doors 4 providing access to the front seat on left and right sides respectively. It also has a side door 5 providing access to the living space rearward of the front seat. It also includes a rear door (not shown) providing access to a rear storage compartment.

The vehicle 1 also includes slide out body members 13 and 14 on each side of the vehicle body 2 rearward of the front seats.

Each slide out member 13, 14 extends across a side wall section of the vehicle body 2 rearward of the front seat and comprises a primary wall portion 15 and end walls 17 and 18 and a bottom portion 19 and a roof 20 extending transverse to the primary wall portion 15. Thus the walls 17 and 18 and bottom and roof 19 and 20 fit into openings defined by the side wall sections of the vehicle body. The internal space defined by the various wall components of the slide out member 13, 14 opens into the vehicle interior. Each slide out member 13, 14 is moveable between a retracted position in which the primary wall portion 15 of the member is broadly aligned with side wall section of the vehicle body 2 as shown in FIG. 1 and an expanded condition when the primary wall portion 15 projects laterally outward from the vehicle body as shown in FIG. 2.

Generally each slide out member 13, 14 will include a basic frame of aluminum tubing with a sheet material applied to this basic frame. In the illustrated embodiments the sheet material is fiberglass although other materials could also be used.

Each slide out member 13, 14 is supported for sliding displacement on the vehicle body 2 by support means in the form of a plurality of longitudinally spaced male and female members 30, 32 that are in engagement with each other. Each male member 30 is received within its associated female member 32 in a way that permits the male member 30 to slide relative to the female member 32.

In the illustrated embodiment each female member 32 is a square tube mounted on the vehicle body 2 defining a passage therein with an open end and a male member 30 in the form of a rod or tube on the slide out member 13, 14 that is received within the member 32 with a snug fit that permits sliding of the members relative to each other. While the cross-sectional shape of the passage and the male member in the illustrated embodiment are square it will be readily appreciated by persons skilled in the art that other complementary configurations could equally be used. The main thing is that the cross-sectional shape of the male and female members complement each other and provide a snug fit with the necessary support which does not permit any pivoting or rattling movement of the two relative to each other.

The contact surfaces of the male member 30 are coated with a smooth coating to reduce friction with the female member 32 within the passage. In one form the coating is nylon or polyurethane although clearly many other low friction coatings could also be provided. The thickness in the coating in the illustrated embodiment is very thin being of the order of 1 mm. Similarly the male member is snugly received within the passage with a space of the order of 0.4 mm on each side. Thus the two members have a very close tolerance and this reduces rattling. The male and female guide members 30, 32 may be made out of aluminum.

Figure 5:
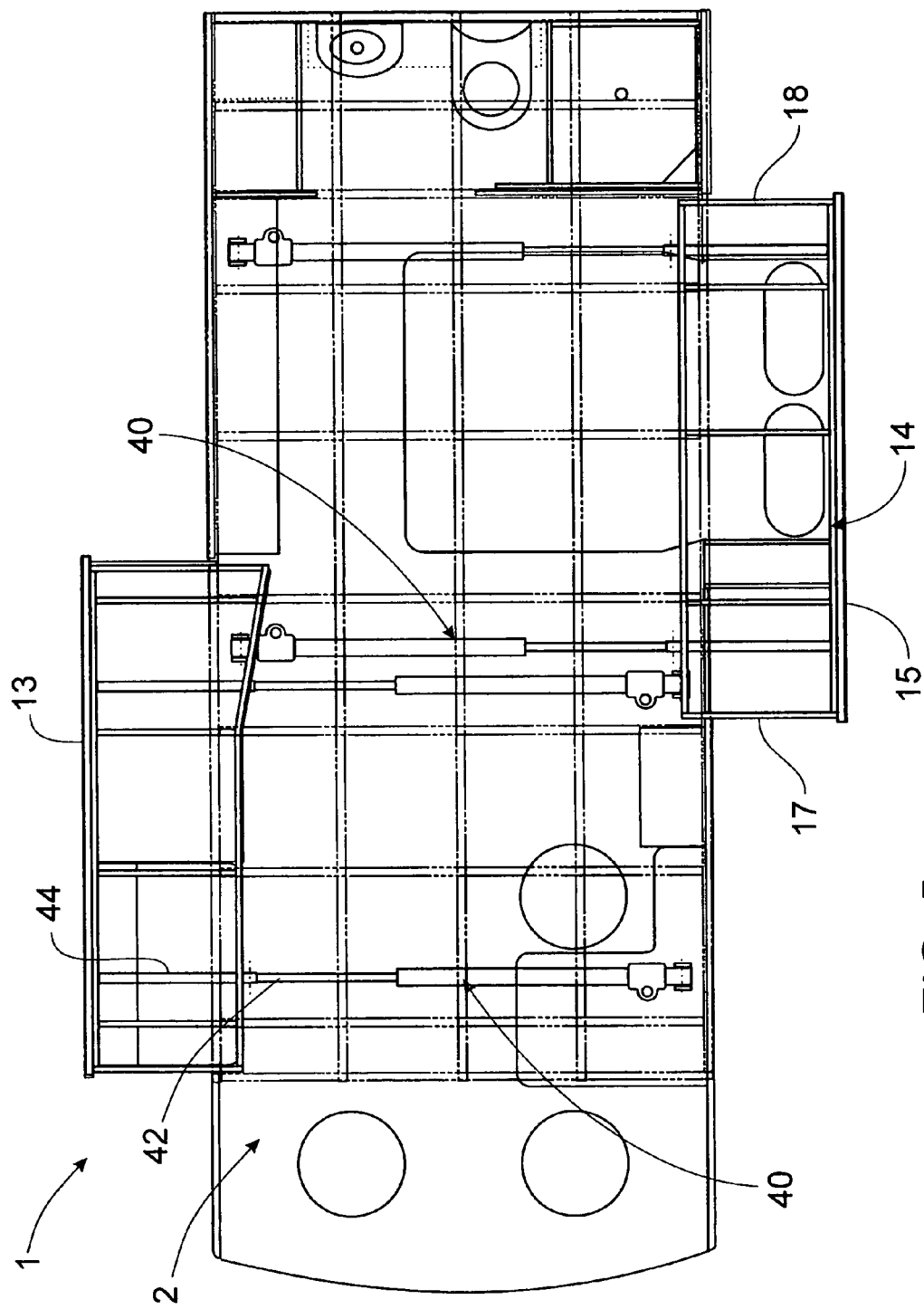
FIG. 5 is a sectional plan view of the vehicle and slide out members of FIG. 1.
Figures 6, 7:
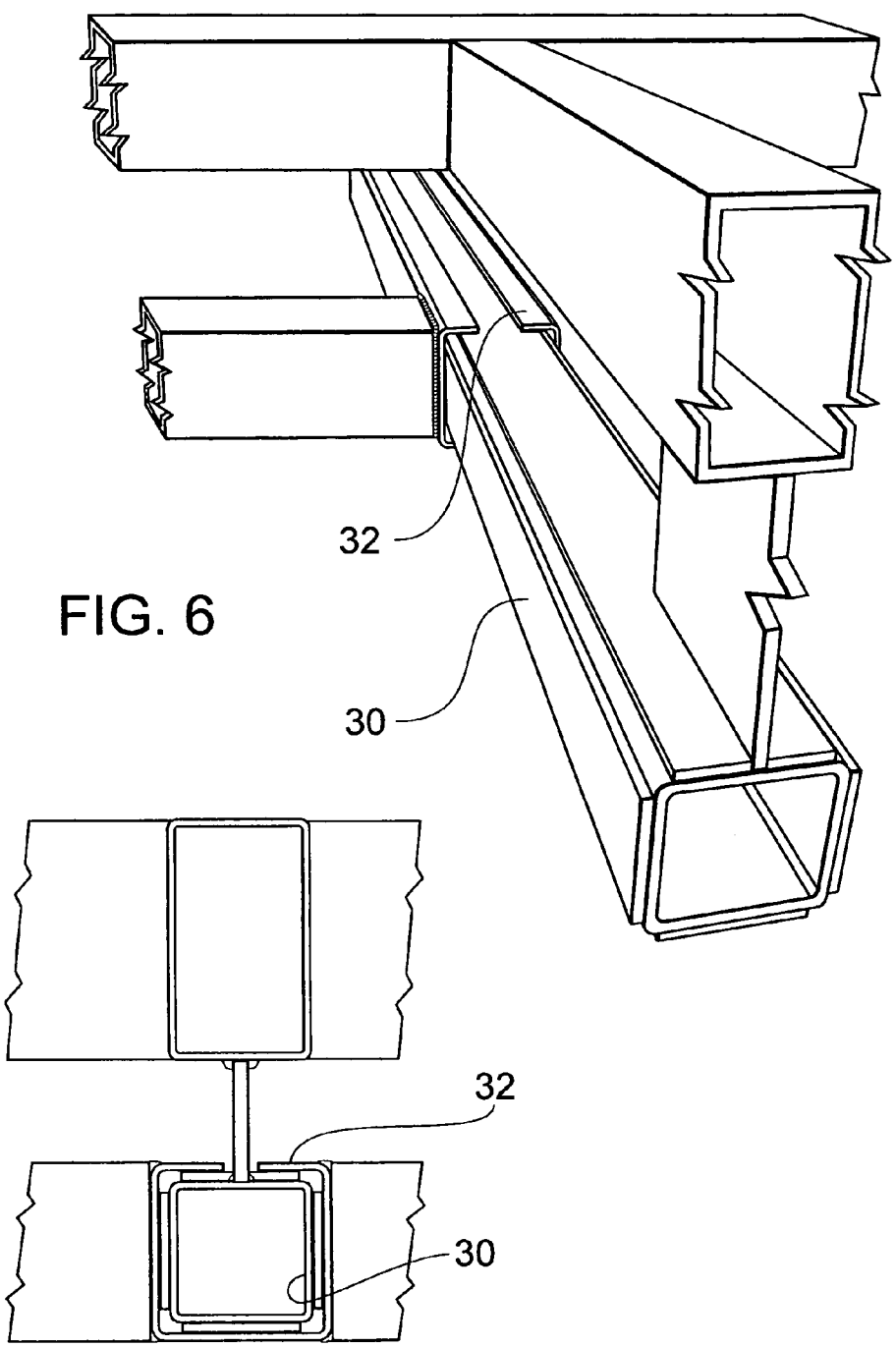
FIG. 6 is a three-dimensional view of the male and female engaging members that support the slide out member on the vehicle body and guide it between said retracted and expanded conditions.
FIG. 7 is a cross-sectional view of the male and female engaging members shown in FIG. 6.
Figure 8:
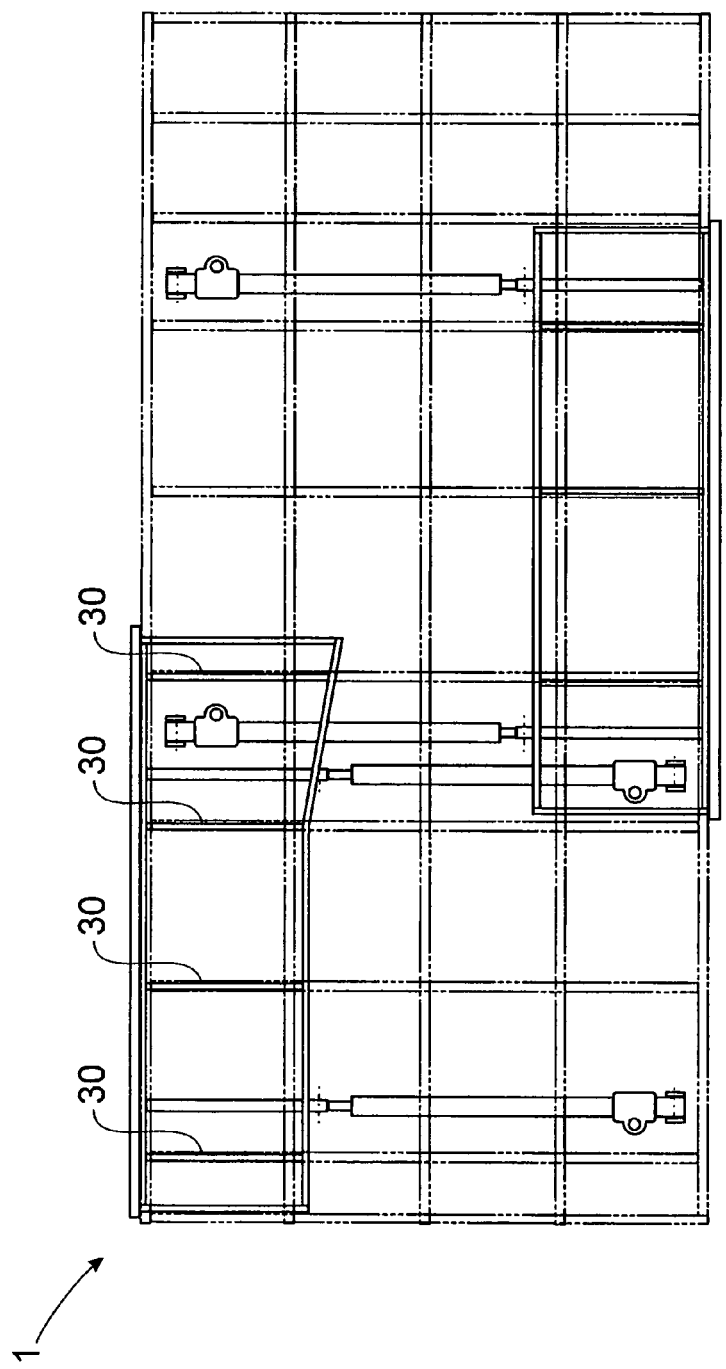
FIGS. 8 and 9 are sectional plan views showing the linear actuator is respectively the retracted and expanded positions.
Figure 9:
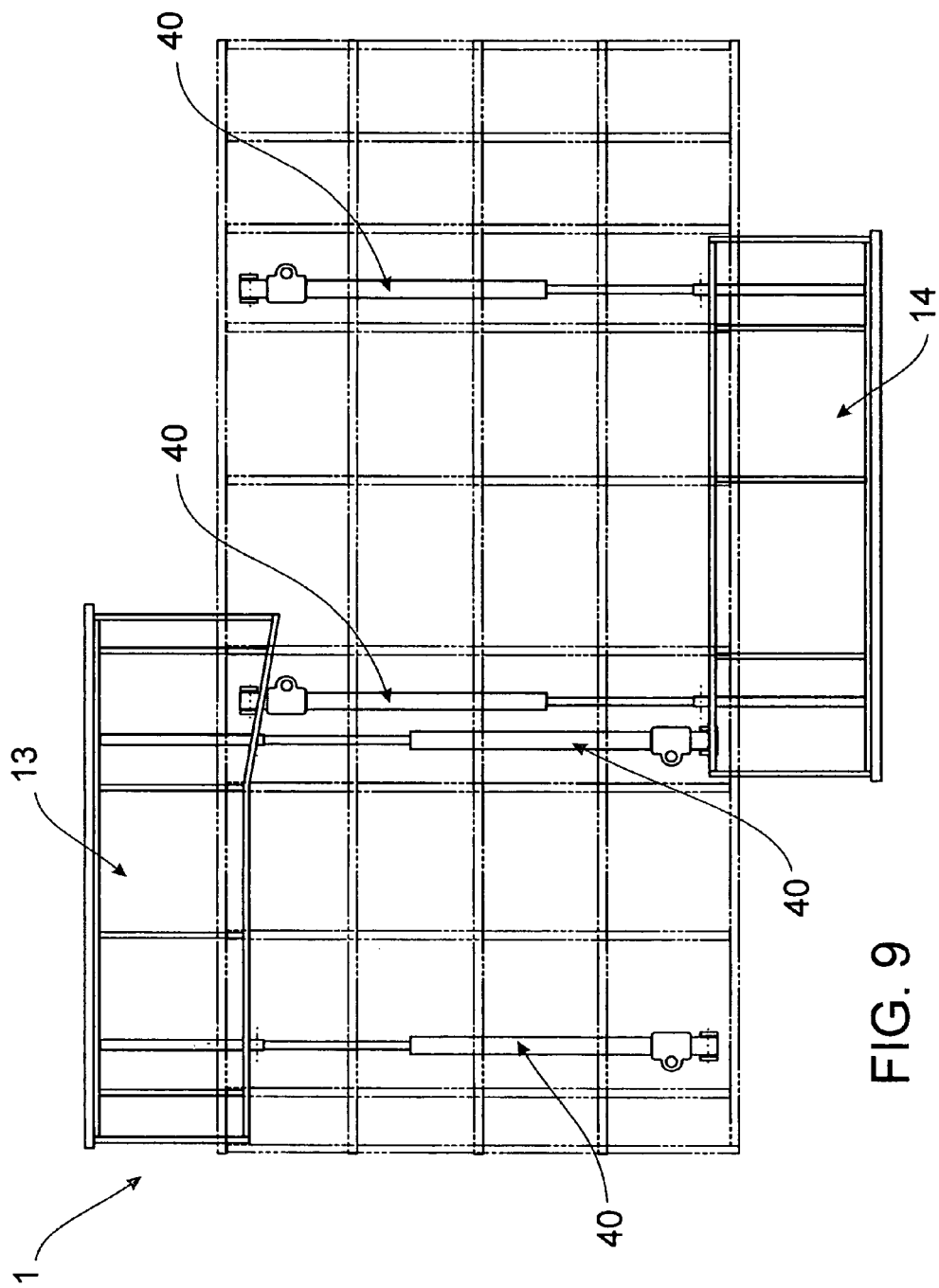

As shown in FIG. 5 each slide out member has four said male engaging members 30 spaced apart along the length of the slide out member 13, 14. This provides the necessary support for the slide out member 13, 14 on the vehicle body 2 in a way that permits the slide out member 13, 14 to move between said retracted and expanded positions. The members 30, 32 are located in a lower region of the slide out member and further members 30, 32 are not required towards the top of the slide out members 13, 14.

The vehicle 1 also includes a drive for driving the slide out member 13, 14 between said retracted and expanded positions while it is supported by the male and female members 30, 32 as described above.

The drive is a linear actuator 40 with a shaft 42 that rotates to effect translational displacement of a passive actuator member that is a nut or sleeve 44 mounted over the shaft 42 along the shaft 42. The nut or sleeve 44 is held against rotation by its mounting on the slide out member 13, 14.

The shaft 42 is in the form of a rod having an external screw thread defined on its surface along its length. The nut 44 has a complementary internal screw thread that engages the screw thread on the rod 42 such that rotation of the shaft 42 relative to the nut 44 which is held against rotation effects linear movement of the nut 44 along the shaft 42.

In the illustrated embodiment the shaft 42 is mounted to the vehicle body 2 and the passive member that is a nut 44 is mounted to the slide out member 13, 14 so that rotation of the shaft produces the linear displacement that moves the slide out member 13, 14 between said retracted and expanded conditions.

There may be two said linear actuators 40 associated with each slide out member, eg one towards each end thereof. The linear actuators 40 may also be located in the services compartment, eg below the floor. Further the engaged male and female members 30, 32 that support the slide out body member on the vehicle body are also located in the services compartment beneath the floor.

The actuator 40 includes a drive in the form of an electric motor (not shown) for driving the shaft 42 to rotate. The motor is energized by power from a battery which conveniently can be provided by the standard battery within the vehicle that is used to supply electrical energy to other components within the vehicle such as the starter motor and the lights.

The actuator 40 may be provided with a travel limit for limiting movement in the form of limit switches to stop movement when each is in the retracted and expanded positions thereby limiting travel of the components beyond these positions.

The linear actuator 40 is particularly suitable for moving the slide out member 13, 14 between the retracted and expanded positions because its movements are very precise. Each turn of the shaft moves the nut only a very incremental amount and this enables the slide outs to be moved very precisely into the retracted and expanded conditions.

In addition each linear actuator 40 only occupies a small amount of space. Typically the actuators 40 will be positioned in proximity to the engaging male and female members 30, 32. Electrical cables (not shown) are required to electrically connect the actuator motor to the battery but these can be led through the vehicle in a very unobtrusive fashion and do not encroach on the available space in any real way. This is an advantageous feature in motor homes where space is at a premium.

The slide out member 13, 14 may further include a floor 50 positioned in between the roof 20 and the bottom 19 but closer to the bottom 19 than the roof 20. This floor 50 divides the space defined by the slide out member 13, 14 into a living space above the floor and a service compartment 52 between the floor 50 and the bottom 19. Thus the service compartment 52 is positioned beneath the living area underneath the floor 50. The vehicle 1 includes a service connector shown generally by reference numeral 53 extending from the vehicle body 2 to the associated service fittings in the vehicle slide out member 13, 14.

The illustrated service connector 53 comprises a plurality of flexible conduits 54 each of which carries a service from the main vehicle body 2 into the slide out member 13, 14. Each flexible conduit 54 has one end 55 that is operatively coupled to a service supply element on the vehicle body 2 and an opposed end 56 that is operatively coupled to the corresponding service receiving element on the vehicle slide out body member 13, 14. Conveniently each said service is received within a discrete flexible conduit 54.

The flexible conduits 54 are usually located in the service compartment 52 below the floor 50 and thus they are not visible to a person in the living area of the vehicle body 2.

The services that are provided through the services conduits may include: electricity for energizing appliances and lights. eg 12 V and 240V, water for washing and cooling, gas for cooking and heating, and also drainage facilities for draining grey water from a kitchen sink, shower and/or a hand basin that needs to be removed from the slide out.

One such flexible conduit 54 is in the form of a flexible pipe that carries water to the slide out body member 13, 14. Another flexible conduit 54 is in the form of a flexible pipe that carries gas to the slide out. Another such flexible conduit contains flexible electrical cable for supplying electricity to the slide out body member 13, 14. Another flexible conduit 54 forms or contains a drain pipe that drains waste water from plumbing fitting such as a sink or basin in the slide out body member 13, 14.

Each flexible conduit 54 has sufficient length to accommodate movement of the slide out body member 13, 14 from the retracted to the expanded positions without a tensile stretching force being applied thereto. That is the conduit 54 has sufficient length such that it is not quite fully extended in the expanded position. The flexible nature of the conduits 54 and their sufficient length enables services to be provided in the slide out member 13, 14 notwithstanding that it undergoes a fair amount of movement in a lateral direction. Each conduit 54 also has sufficient flexibility to undergo a significant amount of bending when the slide out body member 13, 14 moves between the expanded and retracted conditions.

Further the compartment 52 beneath the floor 50, within which the flexible conduits 54 are received, is sized to receive the flexible conduits 54. That is the service compartment 52 accommodates with comfort all the extra length of the various service conduits 54 when the slide out body member 13, 14 is in the retracted position.

The motor home 1 further includes a conduit organizer which is indicated generally by reference numeral 60 in the services compartment 52. The organizer 60 assists in guiding the conduits 54 to unfold in an organized fashion when the slide out body member 13, 14 is moved to the expanded position and to guide the conduits 54 to fold up in an organized fashion when the slide out body member 13, 14 is moved back to the refracted position. The conduit organizer 60 is shown clearly in FIGS 10A and 10B.

The conduit organizer 60 includes a partition member which is indicated generally by reference numeral 62 that extends into the services compartment 52, eg from the primary wall portion 15. The partition member 62 is shown clearly in FIGS. 10A and 10B. In the illustrated embodiment the partition member 62 extends parallel to the end walls 17, 18 of the slide out body member 13, 14 or transverse to the primary wall portion 15 of the slide out body member 13, 14. Further the partition member 62 extends in from the primary wall portion 15 at least part of the width of the slide out body member 13, 14.

Figure 10A:
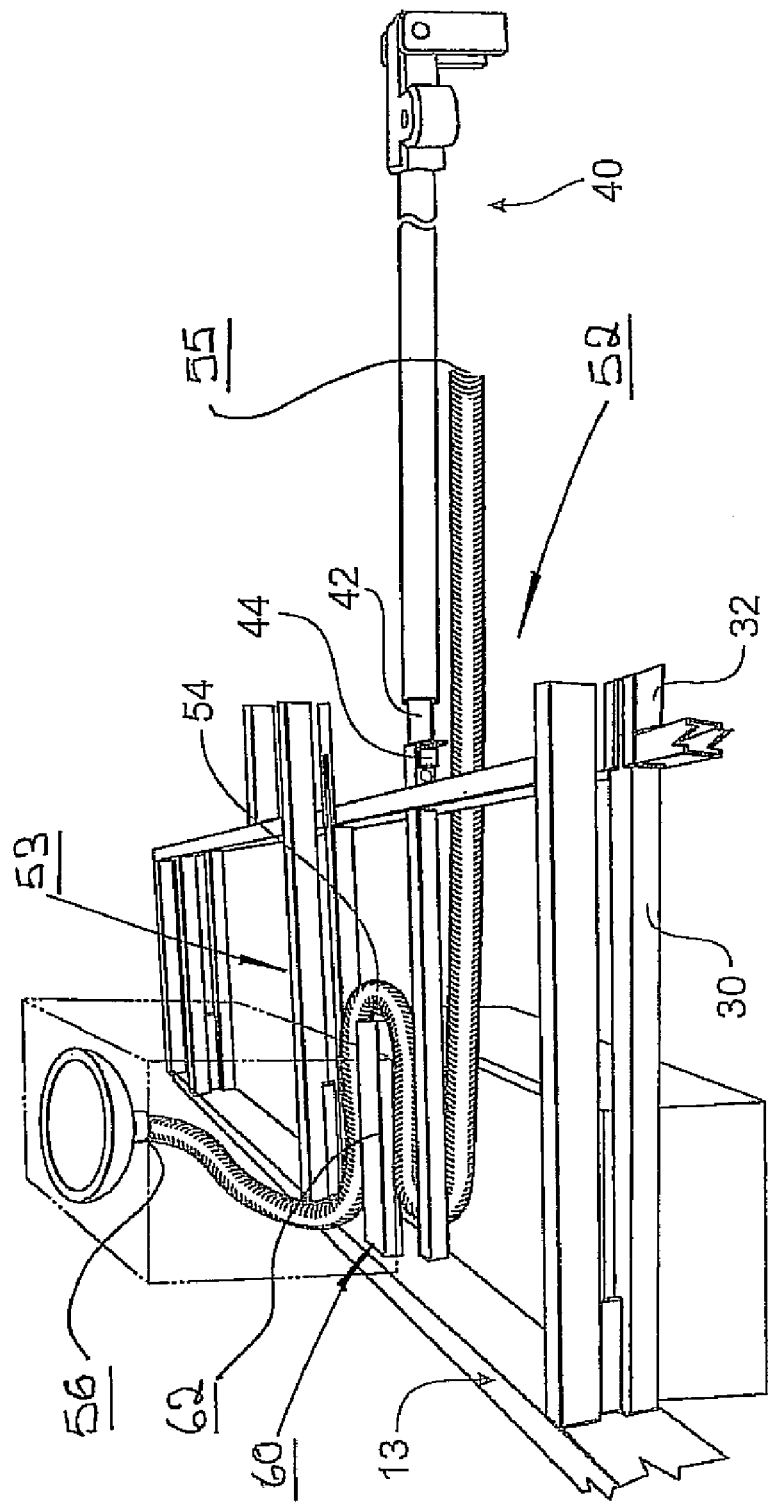
FIGS. 10a and 10b are three-dimensional views of part of a slide out member and vehicle body when the slide out member is in the retracted and expanded positions respectively, with some detail omitted for clarity, the view showing a linear actuator for displacing the slide out member between the retracted and expanded positions on the vehicle body and also a services compartment and services conduit for services provided in the slide out member.
Figure 10B:
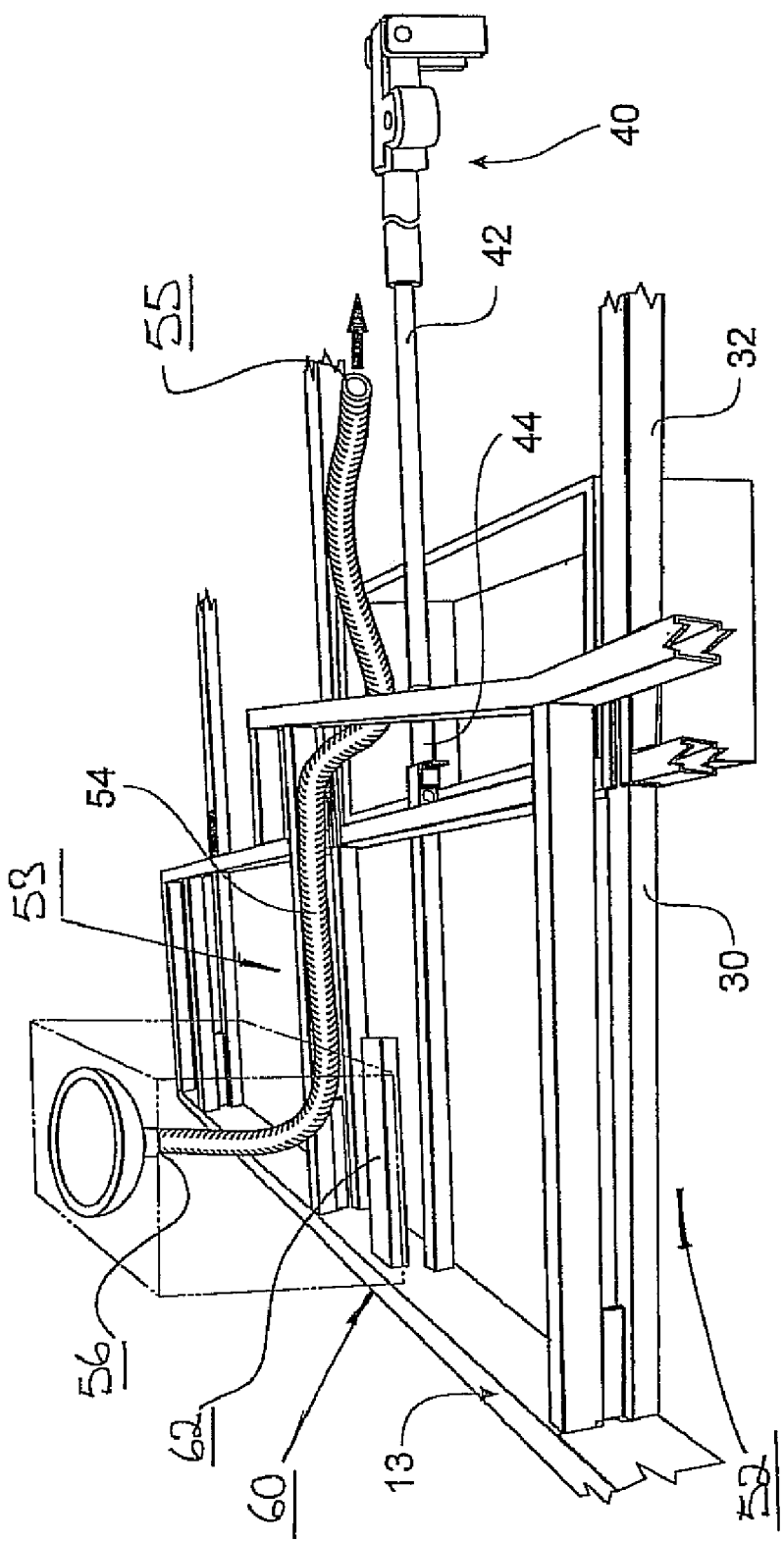
Figure 11:
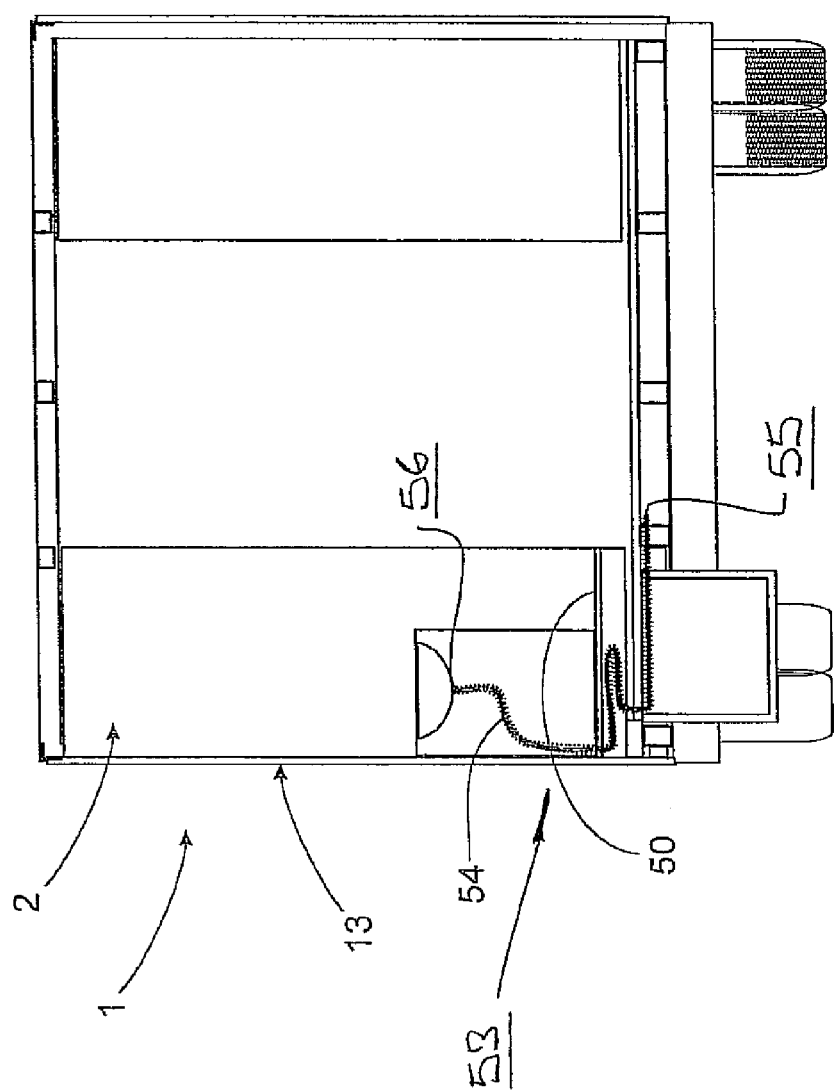
FIG. 11 is an end view of the slide out member and the vehicle body showing the arrangement of the services conduits in the services compartment when the slide out member is in the retracted position.
Figure 12:
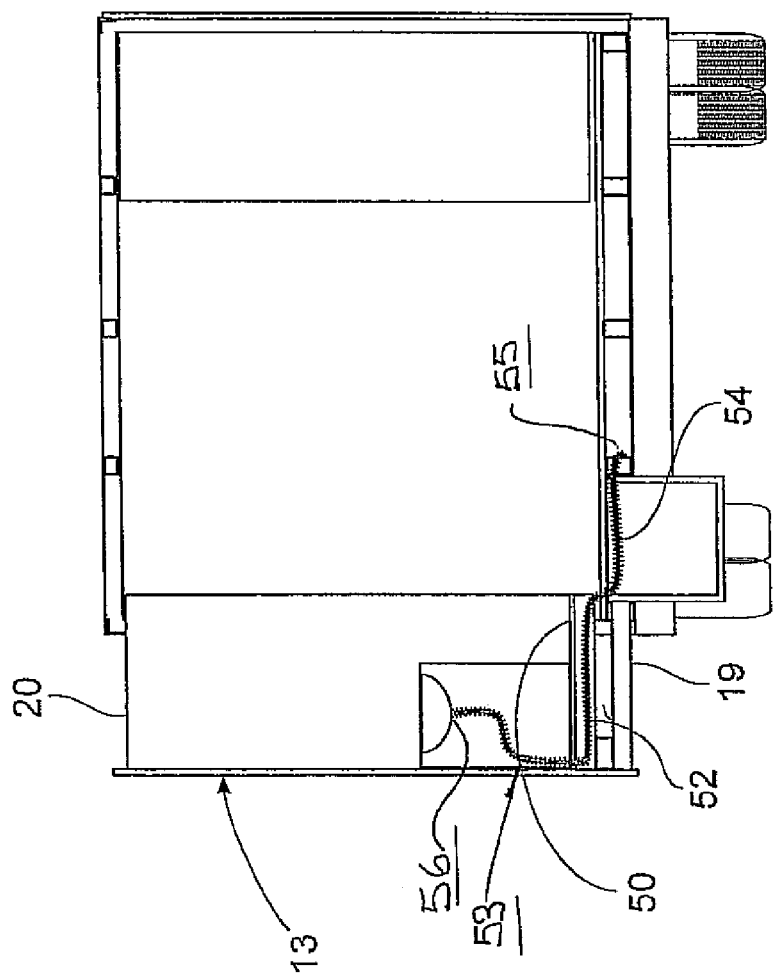
FIG. 12 is an end view of the slide out member and the vehicle body showing the arrangement of the services conduits in the services compartment when the slide out member is in the expanded position.

In use the organizer 60 assists the conduits 54 to fold up in an organized fashion when the associated slide out body member 13, 14 is moved to the retracted position. It does this by directing the flexible conduits 54 around the free end of the partition member 62 as shown in FIG. 10A and FIG. 11. When the slide out body member 13, 14 is moved to the expanded position the partition member 62 is displaced laterally outwardly and this permits the conduits 54 to straighten out and extend out to the service receiving element in its new position displaced laterally outward from the rest of the body 2. This is shown in FIG. 10B and FIG. 12.

Thus this feature enables services such as wash basins and cooking facilities to be housed in the slide out 13, 14 where it is most convenient to house them because of the additional space. Very often a so called kitchen area of a motor home is located in the slide out because this forms a major section of the wall surrounding the interior space in a region which is reasonably accessible. A bedroom area may also be located in the slide out.

Generally the vehicle that is used for the motor home will be a commercially available light commercial vehicle such as a Mercedes van. This is then fitted out and modified as required to produce the motor home.

In use the slide out members 13, 14 are positioned in the retracted condition when the vehicle 1 is used to travel on a road. Any movement of the slide out members that is required to move these members 13, 14 to the retracted position will be carried out before the vehicle is started up for travel. Once in the retracted position the slide out members are received within each side of the vehicle body 2 and do not project outwardly proud of the vehicle body 2 to any significant extent. The width of the vehicle body 2 is broadly the same as that for normal light commercial vehicles that use the road. Certainly it is within the requirements for legal use of a public road.

Generally when the vehicle 1 is travelling the occupants of the vehicle will be seated on the front seat and will not occupy the rear living area of the interior space. In this condition the vehicle can be driven on the road in the normal way and used as a normal vehicle.

When the vehicle 1 taken off the road and it is desired to use it for camping and/or recreation (herein referred to as recreational mode) it is parked at a suitable site in a stationary position. The linear actuators 40 are then used to move the slide outs 13, 14 on each side to their expanded condition. This is accomplished by using a manual control and as described above the energy to do this is provided by the vehicle battery. The slide outs 13, 14 are moved out to their expanded position by the linear actuators 40 in a short space of time. The movement of the linear actuators 40 is very precise and this moves the slide outs 13, 14 into exactly the same expanded position each time. The limit switches associated with the actuators stop the slide outs 13, 14 very precisely in their correct position.

Once in the expanded position the slide out members 13, 14 considerably enlarge the interior space defined in the vehicle body 2 particularly in the lateral direction or direction of width. Thereafter the interior space of the vehicle body and particularly the living space can be used for various activities such as cooking, cleaning and washing in the usual way for a caravan or the like. The slide outs 13, 14 give increased lateral width which is a key dimension to make the living area as utile as possible. This enables the routine activities such as cooking, washing and eating to be carried out in greater comfort than otherwise would be the case.

The additional area created by moving the slide outs laterally outwardly may be used to contain a kitchen facility in the motor home. That is a sink with taps may be mounted to the movable slide out. Further a gas fired cook top may be mounted to the slide out as well as electrical appliances and electrical power points. Another slide out may be used to form part of a bedroom.

By having slide outs on both sides of the vehicle the width of the living space can be increased from 1.8 m to about 3 to 4 m.

An advantage of the slide out described above with reference to the drawings is that the male member is received within the female member with a snug but sliding fit to guide movement of the slide out between the retracted and expanded positions. The close tolerance means that there cannot be much movement or rattling between the two members. This is advantageous because the vehicle travels on roads in use, including rough roads and if the male and female members are not tightly held together they will shake around and rattle. Further a very precise mechanism for moving the slide out relative to the vehicle body is required for this application and these male and female members provide this.

Another advantage of the support provided by the male and female members is that they occupy minimal space and in this application space is at a premium.

By contrast if the usual roller mechanism is used of the type which are found on drawers or the like there will be a substantially looser fit and associated rattling. This will generate noise and will also shorten the life of the mechanism. In addition it is difficult to stop the rattling because the rollers are not readily accessible. Another disadvantage of the roller mechanism is that it occupies more space than the mechanism using male and female members shown in the drawings.

Another advantage of the slide out described above is that it is moved in and out by a linear actuator which is capable of very precise movement. It can be very accurately moved to the same position each time it is displaced into the expanded condition. For this application it is obviously desirable that the slide out be moved to the same position each time. A further advantage of the linear actuator is that it is of very compact construction and only occupies a small amount of space. Again this is important in a motor home where space is at a premium. A yet further advantage is that the shaft of the linear actuator is rotated by an electric motor which is driven off the vehicle battery. Again this is very efficient because it uses an existing battery. Further the electrical wiring from the battery to the motor does not use up a significant amount of space.

By contrast if a hydraulic system was used it would require hydraulic pipes from the hydraulic drive to the slide outs and a hydraulic drive piston and cylinder to actually drive the hydraulic movement. Further a pump would be required for the hydraulic circuit. Yet further its movements would not be as precise.

A further advantage of the slide out described above is that it can provide services such as water, gas and electricity on the slide out body member instead of the fixed part of the vehicle body. This opens up many options in terms of the layout of the fittings within the motor home that would not exist if you could not do this. It does this by having a services compartment beneath the floor and flexible conduits connecting the services from the vehicle body to the slide out in the services compartment. Further by having the services within flexible conduits having sufficient length, movement of the services conduits together with the slide out between the retracted and expanded conditions is enabled. Further the slide out has a partition that helps to organize these cables and direct their movement as the slide out moves between the retracted and expanded conditions. This is beneficial because it is highly advantageous to be able to provide cooking and washing facilities and the like in the slide out and the illustrated embodiment does this in a way that will achieve reliable operation.

A yet further advantage of the slide out members described above is that they are made of aluminum and as such are light and strong. This helps to reduce the overall weight of the vehicle.

It will of course be realized that the above has been given only by way of illustrative example of the invention and that all such modifications and variations thereto as would be apparent to persons skilled in the art are deemed to fall within the broad scope and ambit of the invention as is herein set forth.

The claims defining the invention are as follows:

1. A vehicle having a slide out, the vehicle comprising:
    a vehicle body having a vehicle wall including two side wall sections and defining a vehicle interior;
    at least one slide out body member extending across an opening in a side wall section of the vehicle body that is capable of movement between a laterally expanded position during recreational use of the vehicle and a retracted position during use of the vehicle for travel on the roads, the slide out body member having a primary wall portion for covering at least a portion of the side wall section of the vehicle body and the body member also including end walls and a bottom and roof extending transverse to the primary wall portion so that the space defined by the slide out member opens into and forms part of the vehicle interior;
    a support that supports the body member on the body of the vehicle in a way that permits sliding of the slide out relative to the body of the vehicle between the expanded and retracted positions;
    a drive that drives the body member between said expanded and retracted positions on said support means; and
    a service connector extending from the vehicle body to associated service fittings in the vehicle slide out, and wherein said service fittings provide services that are selected from the group consisting of electricity, water, gas and/or drainage.

2. The vehicle of claim 1, wherein the slide out body member further comprises a floor intermediate to said bottom and said roof, and said body member defines a living space between said floor and said roof and said body member defines a services compartment between said floor and said bottom.

3. The vehicle of claim 1, wherein the service connector comprises one or more flexible conduits.

4. The vehicle of claim 2, wherein each conduit is located in the services compartment beneath the floor.

5. The vehicle claim 4, wherein each flexible conduit has sufficient length to accommodate movement of the slide out member from the retracted to the expanded positions without a tensile stretching force being applied thereto.

6. The vehicle of claim 2, further comprising a conduit organizer.

7. The vehicle of claim 1, wherein the vehicle is a motor home.

8. A slide out body member for mounting to a vehicle body, the slide out body member comprising:
   a primary wall portion for covering over the side of the vehicle and also end walls and a bottom and roof extending transverse away from the primary wall portion in a direction into the vehicle body so as to enclose an interior space of the slide out body member within an interior of the vehicle body, the slide out body member being capable of movement between a laterally expanded position during recreational use of the vehicle and a retracted position during use of the vehicle for travel on the roads;
   a support that supports the body member on the body of the vehicle in a way that permits sliding of the slide out relative to the body of the vehicle between the expanded and refracted positions;
   a drive that drives the body member between said expanded and refracted positions on said support; and
   a service connector connected to the associated service fitting in the vehicle slide out and extending away therefrom to an end that can be attached to the vehicle body to which the slide out body member is mounted, and wherein said service fittings provide services that are selected from the group consisting of electricity, water, gas and/or drainage.

9. The vehicle of claim 3, wherein each flexible conduit has one end operatively coupled to a service supply element on the vehicle body and an opposed end operatively coupled to the corresponding service receiving element on the vehicle slide out.

10. The vehicle of claim 6, wherein the conduit organizer is located in the services compartment to assist in guiding each flexible conduit to unfold in an organized fashion when the slide out body member is moved to the expanded position and to guide the conduit to fold up in an organized fashion when the slide out body member is moved back into the retracted position.

11. The vehicle of claim 10, wherein the conduit organizer comprises a partition member that extends into the services compartment from the primary wall portion.

12. The vehicle of claim 11, wherein the partition member extends parallel to the end walls of the slide out body member or transverse to the primary wall portion of the slide out body member.

13. The vehicle of claim 12, wherein the partition member extends from the primary wall portion at least part of the width of the slide out body member in a direction towards the interior of the vehicle body.

\* \* \* \* \*

UNITED STATES PATENT AND TRADEMARK OFFICE
CERTIFICATE OF CORRECTION

| | |
|---|---|
| PATENT NO. | : 7,300,086 B2 |
| APPLICATION NO. | : 11/142742 |
| DATED | : November 27, 2007 |
| INVENTOR(S) | : Colin Maclean |

Page 1 of 1

It is certified that error appears in the above-identified patent and that said Letters Patent is hereby corrected as shown below:

On Title page item 57 Abstract, Abstract, replace "refracted" with --retracted--

Item 57 Abstract, Abstract, replace "refracted" with --retracted--

Column 13, Line 3, replace "said root" with --said roof--

Column 13, Line 11, replace "vehicle claim 4" with --vehicle of claim 4--

Column 13, Line 34, replace "refracted" with --retracted--

Column 14, Line 2, replace "refracted" with --retracted--

Column 5, Line 44, replace "that that" with --than that--

Column 5, Line 50, replace "it is" with --its--

Column 10, Line 10, replace "refracted" with --retracted--

Signed and Sealed this

Twenty-ninth Day of April, 2008

JON W. DUDAS
*Director of the United States Patent and Trademark Office*